(12) United States Patent
Stracquadaini (10) Patent No.: US 8,552,695 B2
(45) Date of Patent: Oct. 8, 2013

(54) DUAL MODE FLYBACK CONVERTER AND METHOD OF OPERATING IT

(75) Inventor: Rosario Stracquadaini, Vittoria (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 340 days.

(21) Appl. No.: 12/973,591

(22) Filed: Dec. 20, 2010

(65) Prior Publication Data

US 2011/0149614 A1    Jun. 23, 2011

(30) Foreign Application Priority Data

Dec. 21, 2009 (IT) ............................. VA2009A0094

(51) Int. Cl.
*G05F 5/00* (2006.01)
(52) U.S. Cl.
USPC .................... 323/207; 323/283; 363/21.13
(58) Field of Classification Search
USPC .......... 363/21.12, 21.13, 21.16, 21.17, 21.18; 323/206, 207
See application file for complete search history.

(56) References Cited

U.S. PATENT DOCUMENTS

| | | | |
|---|---|---|---|
| 4,546,421 A | 10/1985 | Bello et al. | 363/21 |
| 5,903,452 A | 5/1999 | Yang | 363/97 |
| 6,172,492 B1 | 1/2001 | Pletcher et al. | 323/283 |
| 6,204,649 B1 | 3/2001 | Roman | 323/282 |
| 7,279,876 B2 * | 10/2007 | Adragna et al. | 323/284 |
| 7,295,452 B1 * | 11/2007 | Liu et al. | 363/82 |
| 7,440,297 B2 * | 10/2008 | Adragna et al. | 363/50 |
| 2009/0212756 A1 * | 8/2009 | Shao et al. | 323/285 |

* cited by examiner

*Primary Examiner* — Nguyen Tran
(74) *Attorney, Agent, or Firm* — Allen, Dyer, Doppelt, Milbrath & Gilchrist, P.A.

(57) ABSTRACT

A DC-DC converter includes a power switching device and a mode control logic circuit to control the power switching device and generate an ON-pulse. A flip-flop is configured to be set by the mode control logic circuit. A current mode comparator is configured to reset the flip-flop and to compare a signal based upon current flowing through the power switching device with a signal based upon an output voltage of the dual mode flyback DC-DC converter. A transformer is driven by the current mode comparator. The mode control logic circuit includes a timer starting when a gate driver control signal applied to the power switching device turns the power switching device off and configured to generate a pulse when an off time interval elapses, a zero current detector circuit configured to sense a voltage on the transformer and generate a pulse when the voltage drops below a trigger threshold, and a combinatory logic circuit configured to compare pulse signals generated by the timer and the zero current detector circuit and generate the ON-pulse based thereupon.

18 Claims, 11 Drawing Sheets

DUAL MODE FLYBACK CONVERTER AND METHOD OF OPERATING IT

FIELD OF THE INVENTION

This invention relates, generally, to switching power supplies for electronic devices, and, more in particular, to the control circuit of a flyback DC-DC converter and a method of operating the converter.

BACKGROUND OF THE INVENTION

Regulated power supplies are used in electronic devices and apparatuses. The core of so called switching power supplies that offer a more efficient conversion than classical linear transformer-based power supplies is a switched DC-DC converter. Switched DC-DC converters may be realized with one of many circuital topologies, the choice of which may be dictated by design considerations, convenience or specific requirements.

Generally, hard switching converter topologies give rise to transient signals, the spectrum of which contains high frequency components that may have effects of electromagnetic emissions, introducing noise in the area surrounding the converter circuit. The noise may interfere with information carrying signals or the like imposing the use of additional circuits for preventing spurious interferences with the useful signals or to be compliant with electromagnetic emission standards and rules.

Energy conversion efficiency has paramount importance in most applications and the choice of the circuit topology of the switching converter and its mode of operation, most often implemented by a dedicated control circuit of the switchings, may be carefully chosen in a way to satisfy the application requirements of low noise generation with attendant maximization of efficiency. To this aim multimode switching control converters have been devised, in many of which the dedicated logic automatically switch from one mode to another mode of operation depending on current conditions of operation in terms of input DC voltage of the converter and/or of load conditions (output current delivered by the converter).

A dual-mode power factor correcting converter of this kind is disclosed in U.S. Pat. No. 6,172,492, wherein the converter operates at variable switching frequency, in practice in a quasi resonant (QR) mode when delivering power, (primary mode of operation) and in a fixed off-time (FOT) mode when the converter is in stand-by or in a case delivering a comparably small power (stand-by mode).

In a so-called "flyback" converter that typically employs a transformer, under full load conditions and in presence of a relatively low input DC voltage, a large part of the losses are imputable to conduction losses of the rms current through the primary winding of the transformer and through the power switch connected with it that when the flyback converter operates in a quasi resonant (QR) mode increase sensibly.

In a flyback converter operating in QR mode, the switching frequency decreases when the input DC voltage, Vin, diminishes. It is easily demonstrated that for the same output power, if the switching frequency of the converter decreases, the peak current at the primary ($I_{PK}$) may increase such to verify the equation $$P_O = \frac{1}{\eta} \cdot LP \cdot I_{PK}^2 \cdot f_{SW}$$

If $I_{PK}$ increases, the rms current flowing in the primary winding of the transformer and therefore in the power switch increases, thus increasing the conduction losses according to the following equations (D=duty cycle):

$$I_{RMS} = I_{PK} \cdot \sqrt{\frac{D}{3}}$$

$$P_{Loss\_Cond} = R_{DS\_ON} \cdot I_{rms}^2$$

On the other hand, operation in a quasi resonant (QR) mode has the advantage of reducing switching losses in the power device (often a power MOSFET) that can be significant in case of high input voltage.

SUMMARY OF THE INVENTION

A main objective is to provide an improved switching control method and implementing control circuit for a flyback DC-DC converter capable of reducing overall losses when operating under varying conditions of input line DC voltage and of load.

It has been found that making the flyback converter work in a continuous conduction mode (CCM) when in a condition of relatively low input line voltage and full load, a significant reduction of losses can be achieved and that the advantages of operating in a quasi resonant mode (QR) under conditions of high input line voltage and of relatively low load or at a minimum (stand-by) may be safeguarded by allowing QR operation depending from the prevailing condition between input line voltage level and load (in terms of effects on energy losses).

By automatically implementing the selection of the most efficient mode of operation, an outstanding enhancement of the average efficiency of energy conversion is achieved especially in applications where a relatively high variability of the input DC voltage and of the load conditions is expected.

In order to operate in continuous conduction mode (CCM), a fixed off time (FOT) control of the switchings is preferred, because in a flyback converter it is fundamental that even when operating in CCM with a duty cycle greater than 50% instability of the current loop be prevented. Indeed, this drawback would present itself in flyback converters operating at a fixed frequency in CCM.

DETAILED DESCRIPTION OF THE PREFERRED EMBODIMENTS

Basic and preferred embodiments of the flyback converter of this disclosure will now be described in detail for better illustrating the gist of the claimed invention and the manner in which it may be practiced. The description will be made with reference to the above listed figures though it is understood that alternative schemes may be devised for practicing the novel technique of this disclosure, on the basis of design preferences and/or requirements of the specific application. Therefore the invention is not intended to be limited to the exemplary embodiments described and illustrated herein.

A common way of controlling a flyback converter that will allow operation in a continuous conduction mode is the so-called fixed frequency mode, wherein an oscillator waveform within the controller decides the instant of switching on of the power switch.

A potential drawback is that in case a current mode control is implemented, according to which the switching off of the power switch (often, and, in the example considered, a power MOSFET) is commanded when the current flowing in the power switch reaches a threshold that generally is dynamically fixed by the feedback control loop of the regulated output voltage, instability phenomena occurs when the duty cycle is greater than 50%. A FOT (fixed off time) mode allows preventing this occurrence.

On the other hand, if the flyback converter functions in a quasi resonant (QR) condition in order to reach the maximum benefit when functioning at high input DC voltage, it may be helpful to fix a relatively high "reflected" voltage, such that if and when the converter is functioning at a DC input voltage relatively much lower than the design high input voltage, it will bring the converter to function with a duty cycle (D) greater than 50%.

Notably, for operating in a FOT mode, it is generally helpful to employ a timer for fixing the time interval during which the power switch of the converter remains off, at the end of which the power switch is turned on again to be eventually switched off when the current therethrough reaches a threshold value that is fixed by the feedback control loop of the regulated output voltage of the converter according to the current mode control.

It may be demonstrated that when operating in fixed off time continuous conduction mode (CCM) the switching frequency of the converter is given by the following expression:

$$fswFOTCCM = \frac{1}{TOFF \cdot \left(1 + \frac{VR}{Vin}\right)}$$

where Vin is the input DC voltage and VR is the reflected voltage that is fixed upon designing the transformer of the flyback converter circuit. The reflected voltage (VR) is the voltage on the primary winding when the power switch is off and the transformer has energy stored in it. It depends on the output voltage and the transformer turn ratio, and practically it corresponds to the output voltage "reflected" by the transformer to the primary side.

Basically, in order to control a flyback converter in the improved mixed mode of this disclosure, it is sufficient that the turning on of the power switch be determined by whichever of the following two signals occurs first:

1) a zero current detect signal (ZCD) announcing the end of the de-magnetization of the transformer, which, according to a quasi resonant mode of operation, turns on the power switch (MOSFET) at lowered drain voltage;

2) an end off time signal (END_TOFF_PULSE), which, according to a fixed off time mode of operation, turns on the power switch (MOSFET) at the end of the pre-fixed off time interval.

Figure 1:
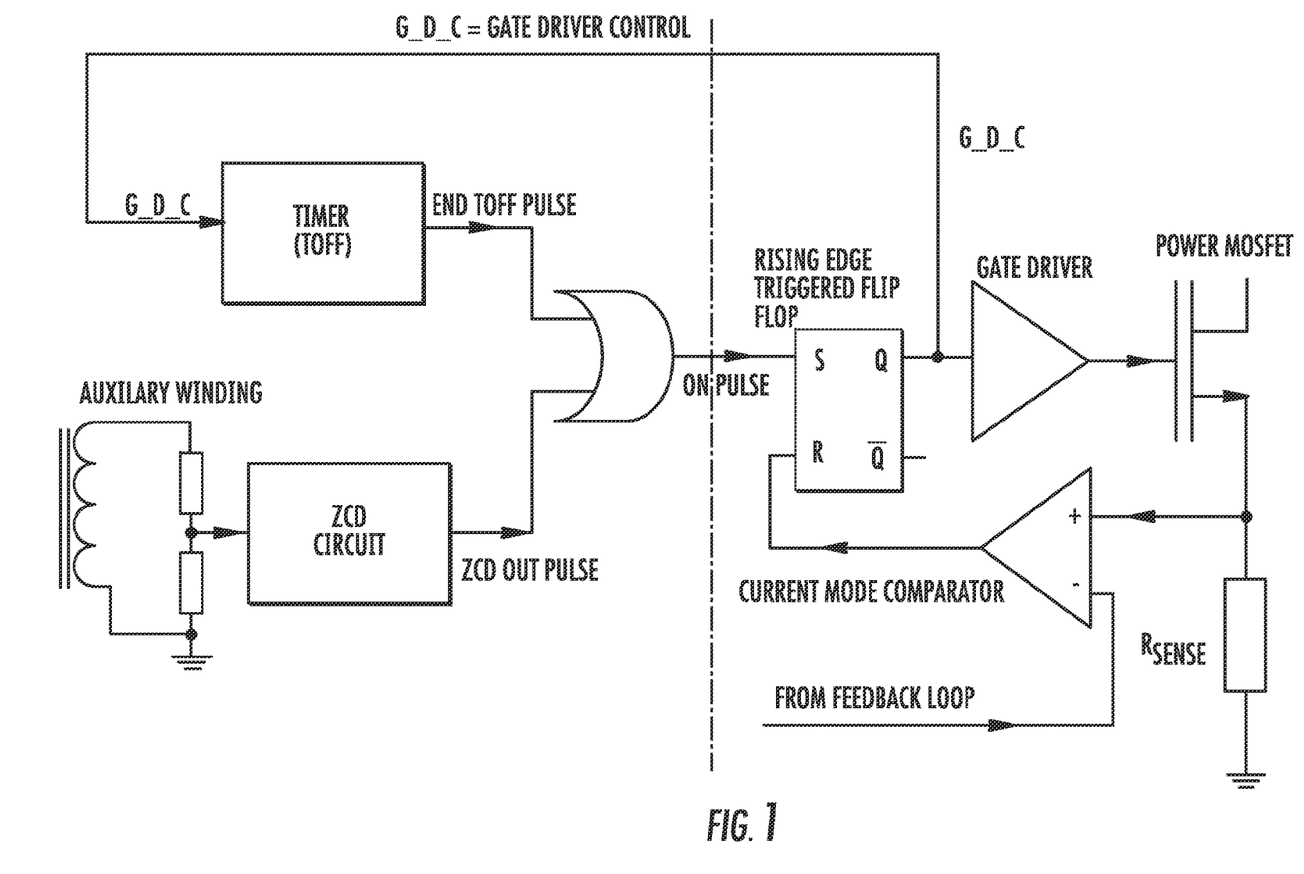
FIG. 1 is a basic circuit diagram of a mixed mode control logic circuit implementing the mode selection algorithm of this invention.

With reference to the functional block diagram of FIG. 1, the implementing mixed mode control logic circuitry includes a fixed off time interval timer TIMER_TOFF and a zero cross detection circuit ZCD_CIRCUIT. It also includes a logic gate for ORing the respective pulses generated by the TIMER_TOFF and by the ZCD_CIRCUIT blocks in order to generate the set pulse(s) of a common rising-edge triggered flip flop that controls a driver stage GATE_DRIVER of the power switch of the flyback converter, which exemplarily is a power mosfet MOSFET.

In the circuit shown in FIG. 1, there is also depicted the comparator (current mode comparator) of the signal representative of the current flowing through the power mosfet, sensed on a series resistor, Rsense, with the signal produced by the output voltage regulation feedback loop of the converter for generating the reset (R) signal of the flip flop, according to a common feedback control of the output voltage of a switching converter.

The zero cross detector block ZCD_CIRCUIT is shown to be input with a scaled replica of the voltage present on a transformer winding, that may be a purposely made auxiliary windings as indicated in FIG. 1.

Figure 2A:
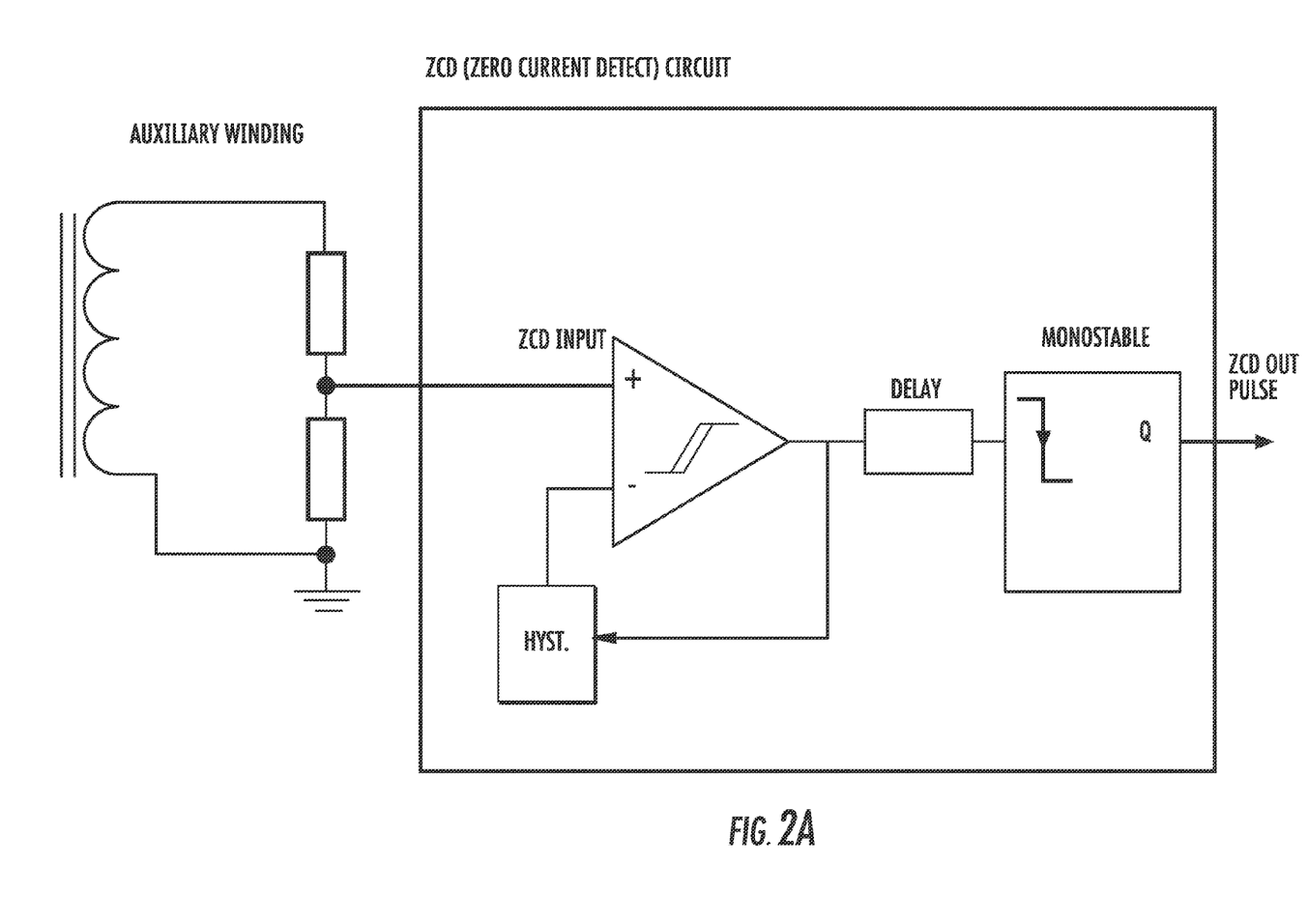
FIGS. 2A and 2B are, a circuit diagram of an exemplary embodiment of a zero cross detect circuit usable in the mixed mode control circuit of FIG. 1 and time diagrams of significant signals in the circuit.

The ZCD CIRCUIT block may be realized as shown in FIG. 2A. The circuit generates a pulse ZCD_OUT at the end of the de-magnetization of the transformer of the flyback converter. This is done by sensing the voltage on an auxiliary winding of the transformer that is proportional to the voltage of the primary winding. The sensing may be made through a common resistive voltage divider.

When the input voltage ZCD_INPUT drops below a certain threshold, called the trigger threshold, the pulse is released at the output. In order to be able to do this, the circuit is "armed", which means that the ZCD_INPUT voltage is first be at a level higher than another threshold, called the arming threshold that is higher than the trigger threshold. The pair of thresholds may typically be the voltage thresholds of a hysteresis comparator as symbolically depicted in the circuit diagram of FIG. 2A.

Figure 2B:
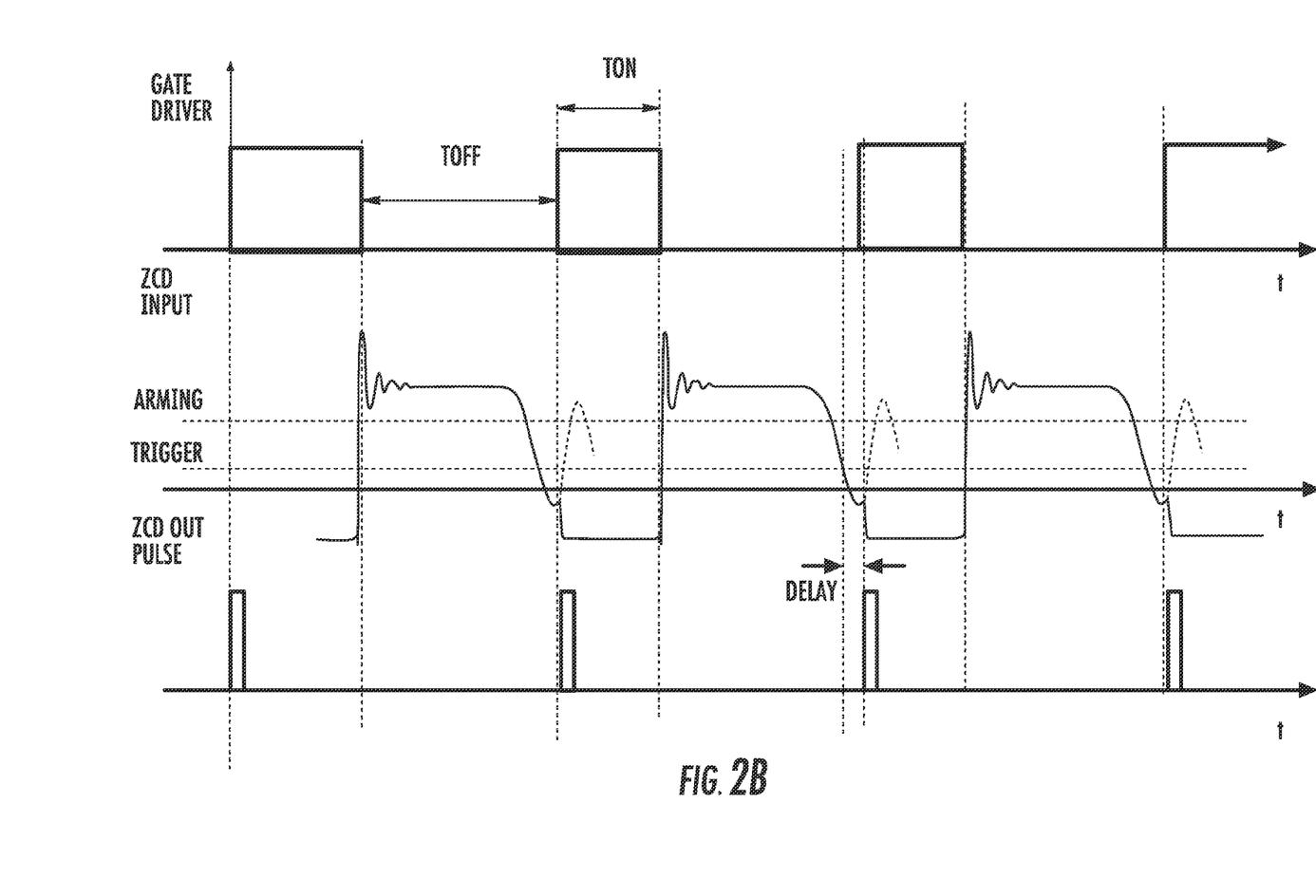

Moreover, in order to turn on the power switch (MOSFET) in coincidence with a minimum of its drain voltage waveform, the pulse is properly delayed from the instant the trigger threshold is crossed. This is graphically depicted in the time diagrams of FIG. 2B.

Figure 3A:
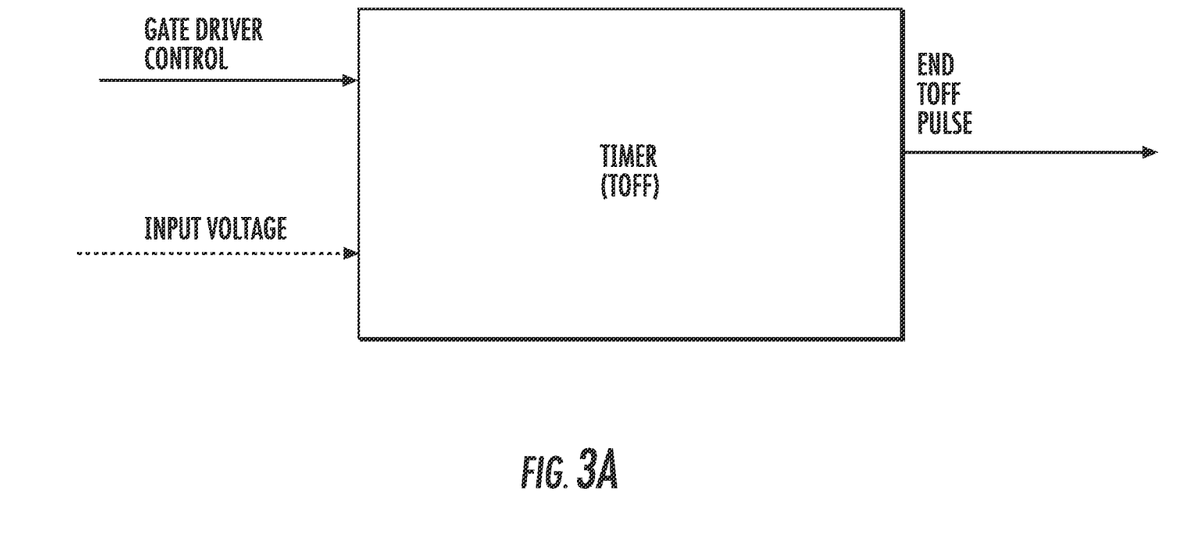
FIGS. 3A, 3B and 3C are a functional block diagram, an exemplary circuit embodiment thereof and time diagrams of significant signals of a $T_{OFF}$ time generating timer usable in the mixed mode control circuit of FIG. 1.
Figure 3B:
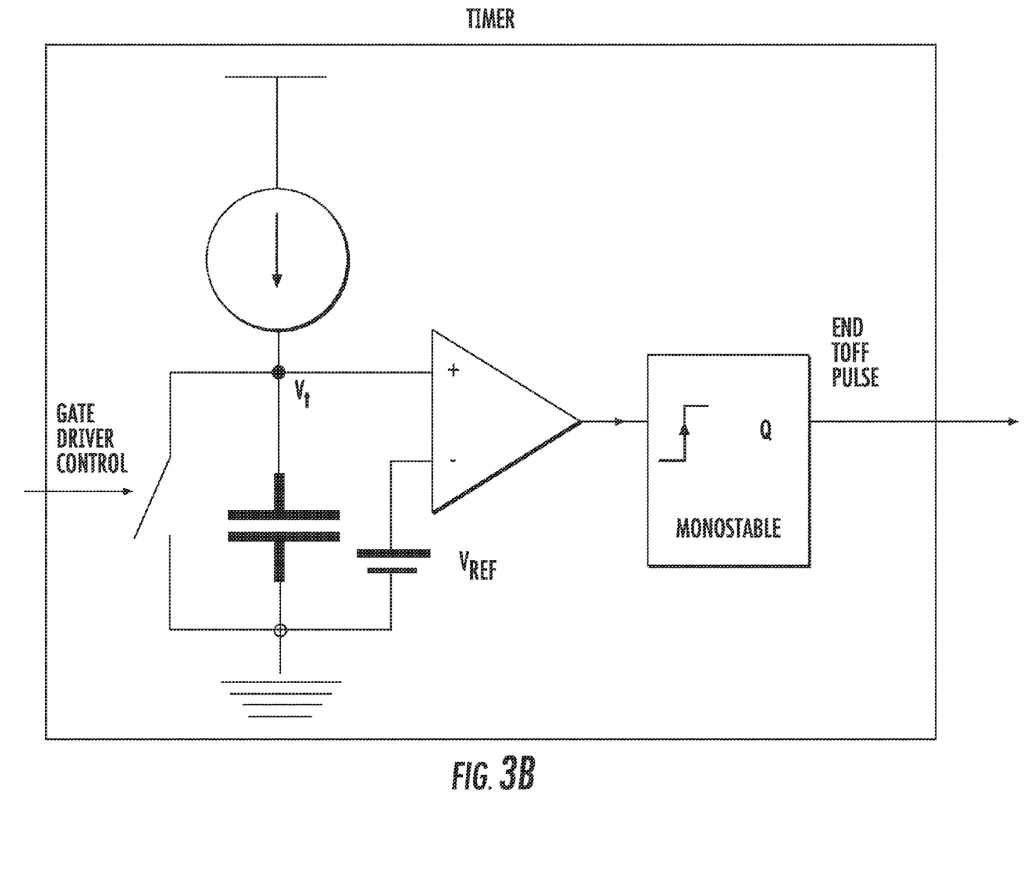
Figure 3C:
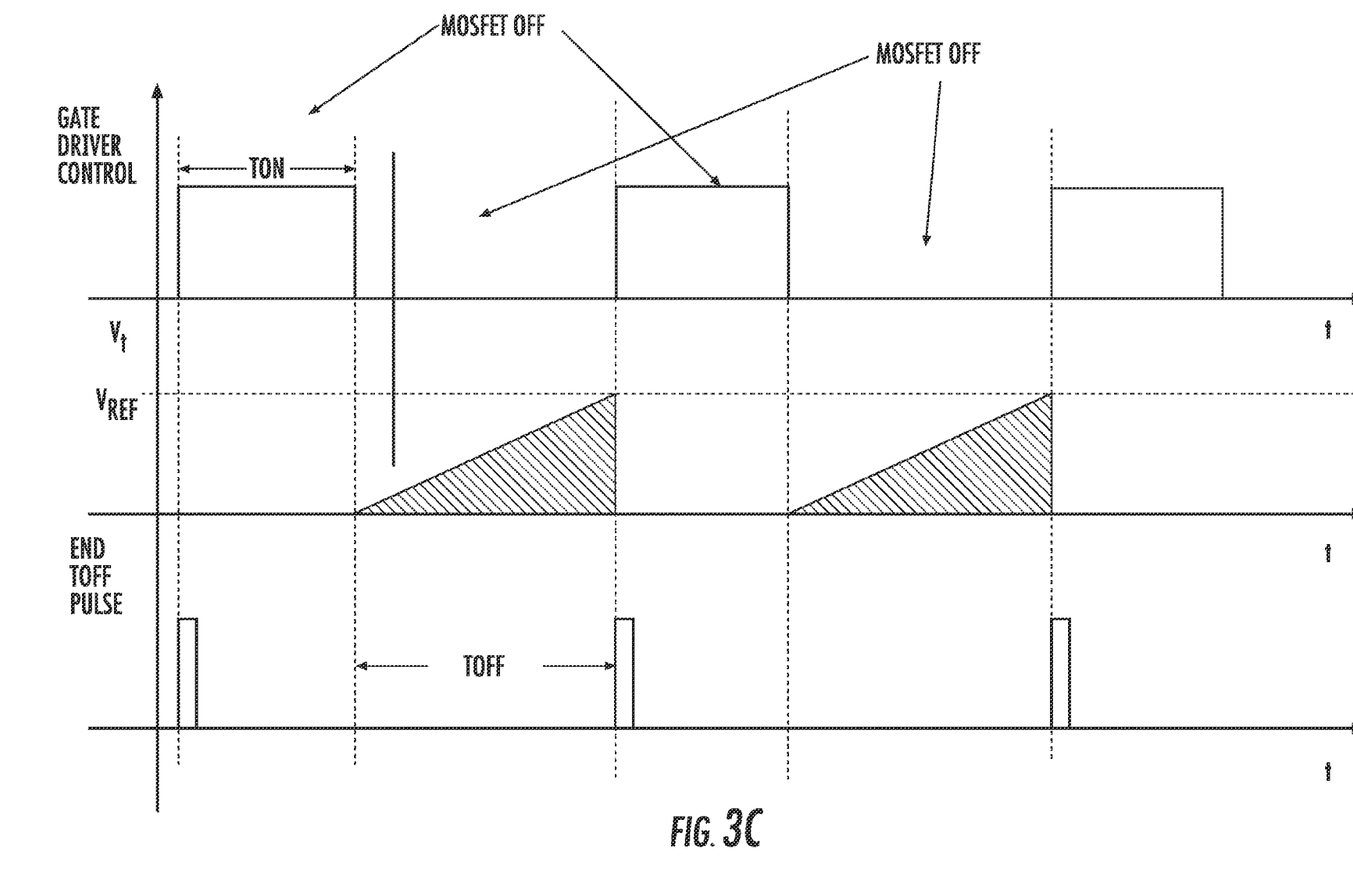

The TIMER_TOFF block of the diagram of FIG. 1 may be functionally depicted as shown in FIG. 3A and an exemplary circuit implementation may be as depicted in FIG. 3B. According to this basic embodiment, the time interval TOFF is established by a timer circuit that starts when the power switch (MOSFET) is turned off. When the timer end it is count, releases the End_TOFF_Pulse. The time interval corresponds to the time taken to charge a capacitance with a constant charge current up to a certain voltage as graphically illustrated in the time diagrams of FIG. 3C.

As symbolically depicted in the circuit of implementation of the timer of FIG. 3B, the constant charging current of the capacitance is generated by a dedicated current generator capable of generating a constant charging current of the capacitance.

Figure 4:
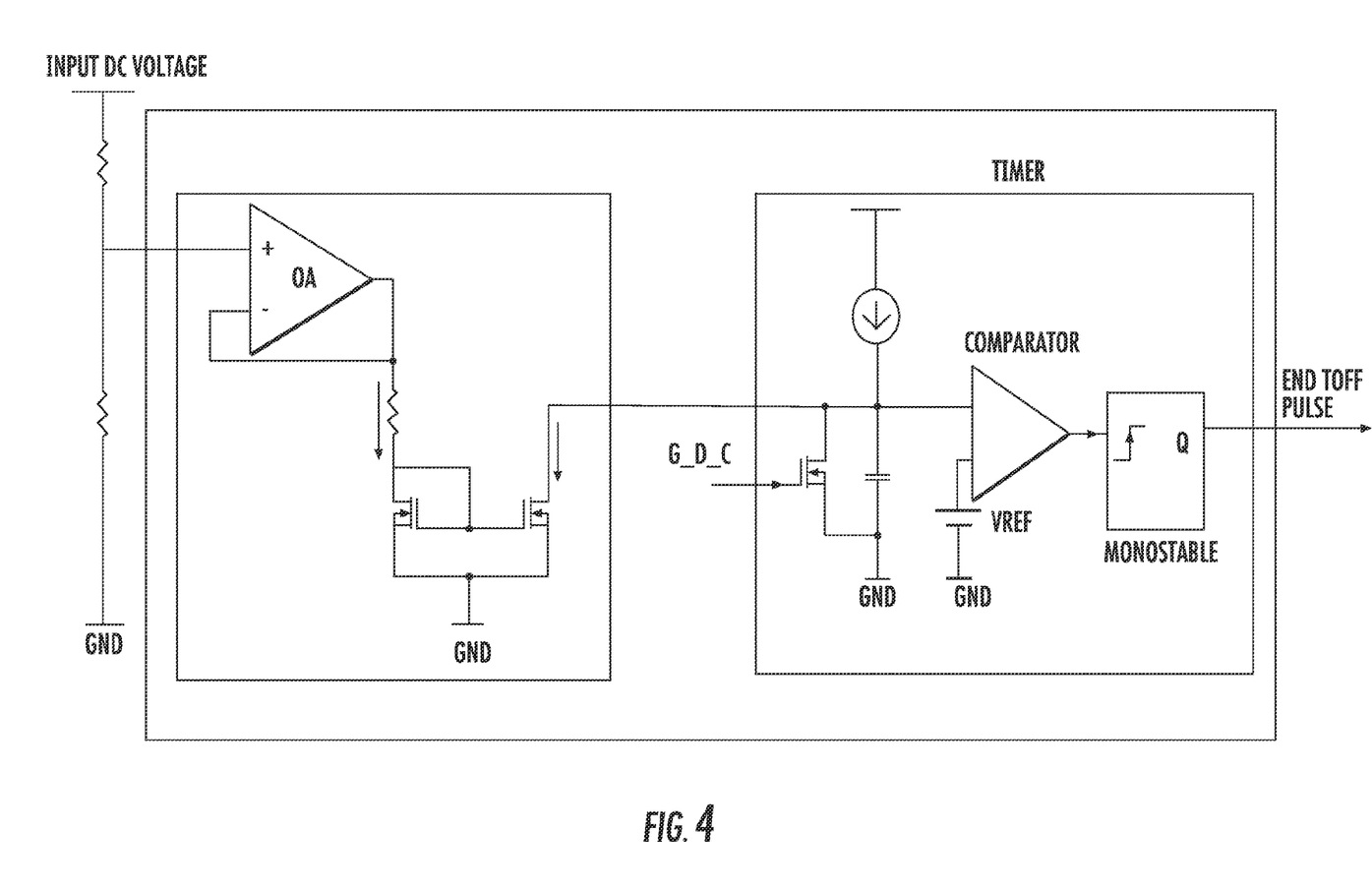
FIG. 4 is a circuital embodiment of circuitry for making the $T_{OFF}$ time generated by the timer dependant from the input DC voltage of the converter, according to the present invention.

Another exemplary embodiment of the TIMER_TOFF block of FIG. 1 is shown in FIG. 4, wherein a charge current generator proportional to the input DC voltage is implemented with an operation amplifier OA of a scaled replica of the input line DC voltage of the converter and by a current mirror that, when the charge of the input capacitance of the timer circuit is triggered by the gate driver control signal G_D_C of the power switch (interrupting the grounding bypass path), makes the net charge current of the input capacitance dependent from the current output by the operational amplifier OA. In the embodiment of FIG. 4, the TOFF time will be linearly dependent from the converter input voltage.

In case that for the contemplated application, a "valley skipping" technique may be implemented for preventing the switching frequency from becoming excessively high when functioning in quasi resonant (QR) mode at a relatively high input line DC voltage and relatively low load or at minimum load (stand-by), the control circuit for flyback DC-DC converters of this disclosure may be further refined to implement in a simple and effective way the "valley skipping" technique.

Figure 5:
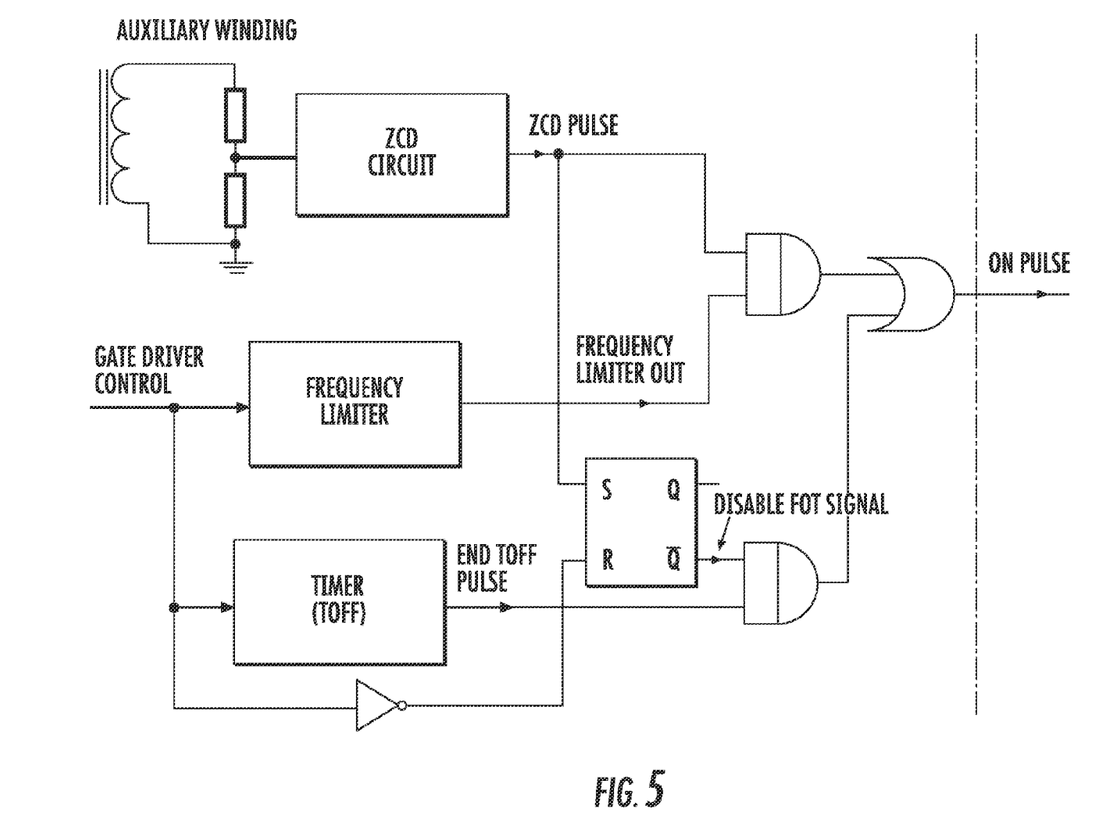
FIG. 5 is a functional block diagram of an alternative and preferred embodiment of the mixed mode control logic of FIG. 1.

The increase of switching frequency may be simply limited by preventing the turn on of the power switch at the end of the TOFF interval after a first valley has been skipped whenever TOFF ends before a ZCD signal relative to a successive valley has occurred. To help ensure this, the control circuit of FIG. 1 may be modified as shown in FIG. 5. In practice, it is sufficient that at the occurrence of a first valley the ZCD signal disable the FOT mode of operation.

FIG. 5 illustrates a functional block diagram of the enhanced mode control circuit enhanced by valley skipping according to such an optional embodiment.

Figure 6A:
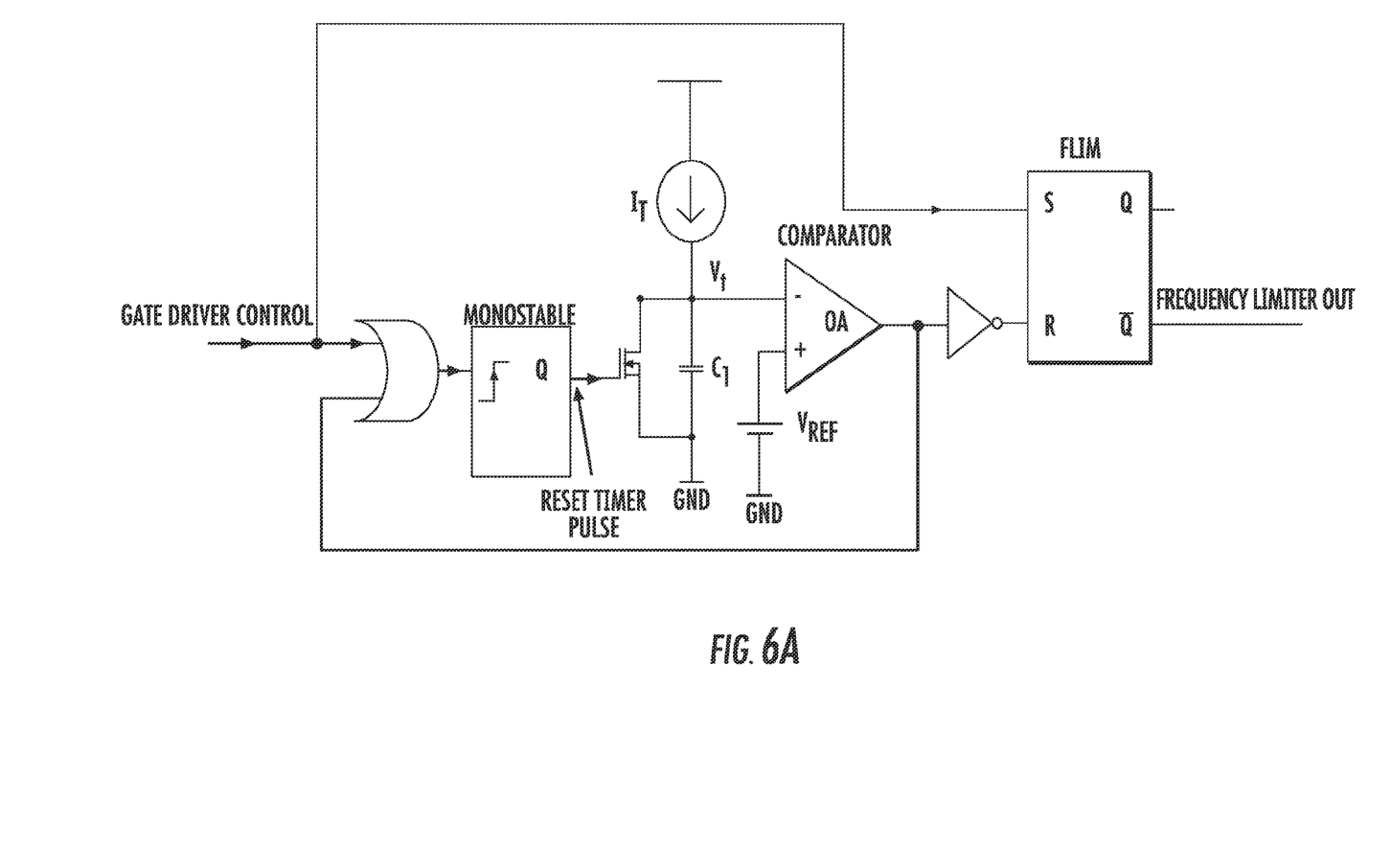
FIGS. 6A and 6B are a functional block diagram of the frequency limiter block of the alternative diagram of FIG. 5 and time diagrams of significant signals of the circuit of FIG. 6A.

FIG. 6A is an exemplary circuital embodiment of the additional block FREQUENCY LIMITER of the diagram of FIG. 5 used to implement valley skipping technique that keeps the switching frequency always below $f_{LIM}$ (see time diagram of FIG. 6B).

Figure 6B:
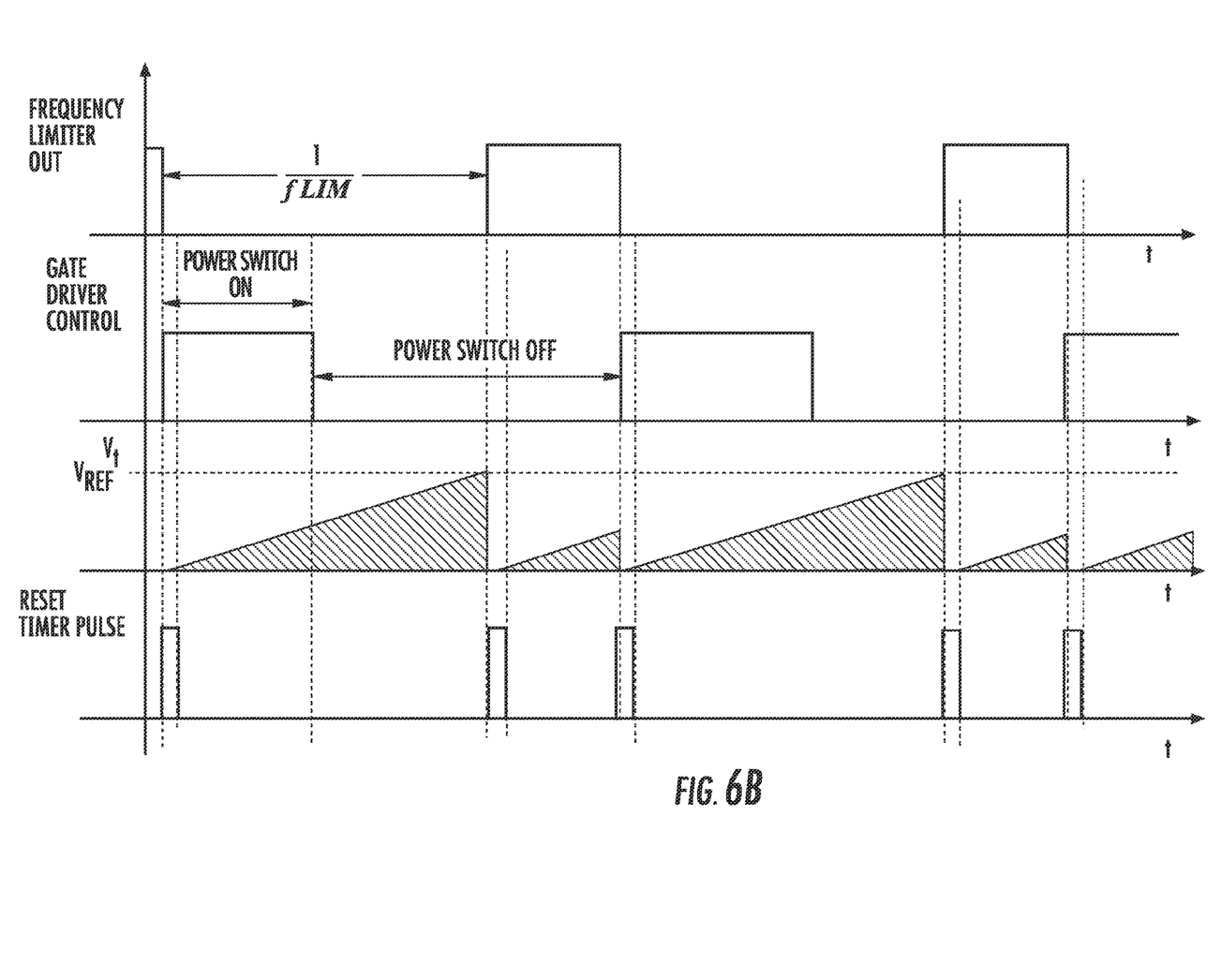

As illustrated in the time diagrams of FIG. 6B, when the power switch (MOSFET) is turned ON (G_D_C goes high) the set/reset flip flop (FLIM) is set and its inverted output Q goes low, thus disabling an eventual ZCD_PULSE. Simultaneously, the capacitor $C_1$ discharges and the voltage $V_t$ becomes null. When the RESET_TIMER_PULSE has elapsed, the capacitor $C_1$ charges and the voltage $V_t$ rises linearly. When the voltage $V_t$ exceeds the threshold $V_{REF}$, the flip flop (FLIM) is reset and the signal FREQUENCY_LIMITER_OUT is set high. At the successive turn on of the power switch the signal FREQUENCY_LIMITER_OUT is again set low. Of course the threshold $V_{REF}$ may be fixed at the design stage or in any other manner.

Referring to the circuit diagram of FIG. 5, the logic combination of the ZCD pulse and of the end TOFF pulse, differently from the basic embodiment of FIG. 1, is conditioned by the signal FREQUENCY_LIMITER_OUT output by the FREQUENCY_LIMITER block and by the DISABLE_FOT_SIGNAL, satisfying the requisite that at a first valley of the drain voltage waveform VDRAIN of the power switch, the signal ZCD_PULSE that if present means that the converter is working in discontinuous mode, disables the FOT-CCM mode such that the inverter keeps working always in quasi resonant mode (QR) when operating in discontinuous mode, eventually in valley skipping mode.

Figure 7:
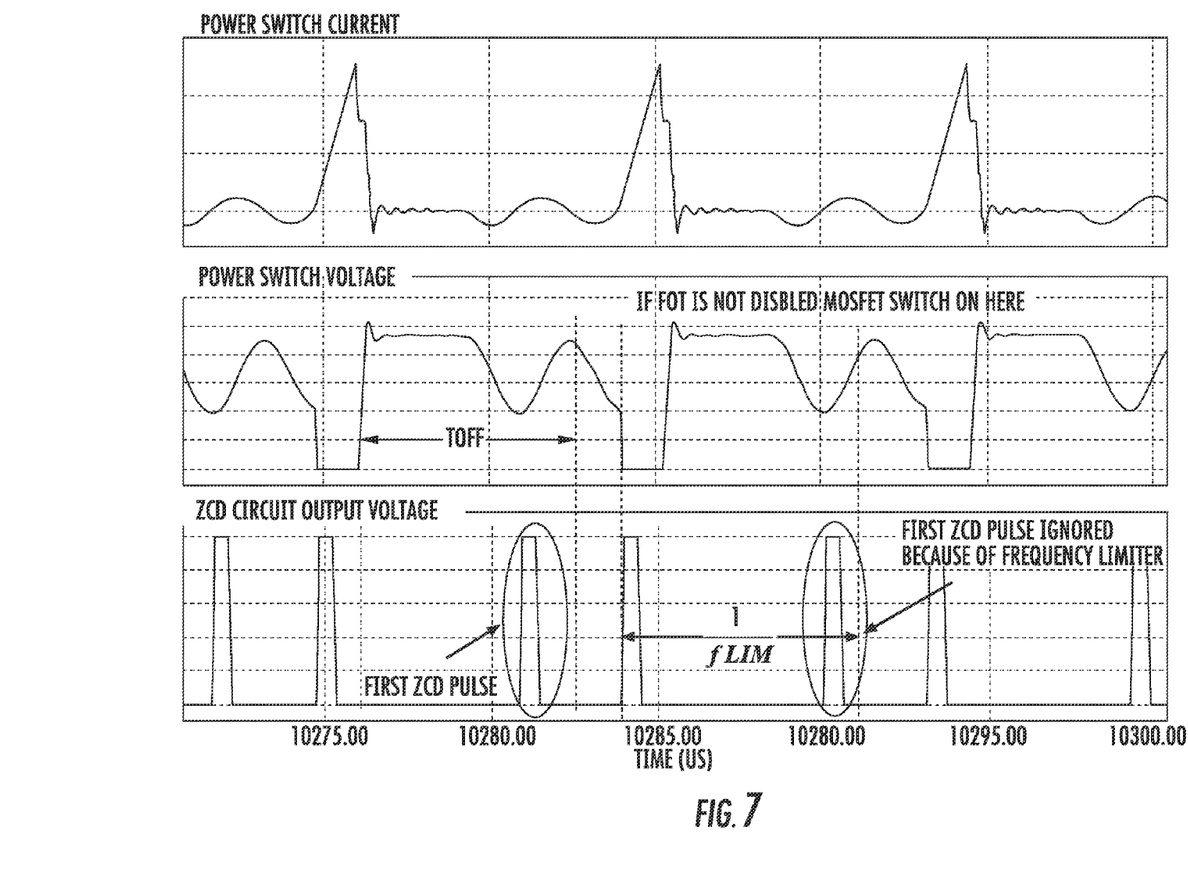
FIG. 7 are time diagrams showing the waveforms of relevant signals of the mixed mode DC-DC converter of this invention according to the preferred embodiment of FIG. 5.

FIG. 7 shows time diagrams of the drain current IDRAIN, of the drain voltage VDRAIN and of the output ZCD_PULSE of the ZCD CIRCUIT. From the time diagrams of FIG. 7, it is possible to see that if a first valley of the drain voltage waveform VDRAIN occurs before the time $1/f_{LIM}$ elapses, the power switch is not turned on, thus the first ZCD pulse is skipped. As shown in FIG. 7, if the interval TOFF expires after a first valley has occurred, according to the control logic of FIG. 1, the power switch would be turned on bringing the converter to work in discontinuous mode (no valley skipping). In order to prevent this, the system may be forced to work in valley skipping mode even in the above-discussed event by implementing a control logic circuit modified according to the block diagram of FIG. 5, such that in practice a first ZCD_PULSE disables FOT operation and the power switch (MOSFET) may eventually be turned on in coincidence with a successive valley.

That which is claimed:

1. A DC-DC converter configured to be coupled to a transformer and configured to be switched between a quasi-resonant discontinuous conduction mode and a fixed off time continuous conduction mode, the DC-DC converter comprising:
   a power switching device;
   a driver stage for said power switching device;
   a mode control logic circuit configured to generate an ON-pulse;
   a rising edge triggered flip-flop coupled to said driver stage and configured to be set by said mode control logic circuit;
   a current mode comparator configured to reset said rising edge triggered flip-flop and to compare a signal representative of current flowing through said power switching device with a signal representative of an output voltage of the DC-DC converter;
   said mode control logic circuit comprising
      a timer configured to start when a gate driver control signal applied to said driver stage turns said power switching device off and configured to generate a pulse when an off time interval elapses,
      a zero current detector circuit configured to sense a voltage on the transformer and generate a pulse when the voltage drops below a trigger threshold, and
      a combinatory logic circuit configured to OR pulse signals generated by said timer and said zero current detector circuit and generate the ON-pulse based thereon; and
   said mode control logic circuit further comprising
      a set/reset flip flop configured to be set by the gate driver control signal to thereby produce a frequency limiter output signal,
      a reference threshold comparator timer configured to generate an output signal which resets said set/reset flip flop and comprising a current path switch, and
      a triggered capacitance charging ramp generator comprising a logic gate configured to OR the gate driver control signal and the output signal of said reference threshold comparator timer to thereby generate an output signal to turn on said current path switch.

2. The DC-DC converter of claim 1, wherein said timer comprises a ramp generating circuit configured to be triggered when said power switching device is turned off.

3. The DC-DC converter of claim 2, wherein said ramp generating circuit comprises a constant current generator configured to generate a current proportional to an input voltage of the DC-DC converter.

4. The DC-DC converter of claim 1, wherein said frequency limiting circuit is configured to disable a pulse generated by said zero current detector circuit until a successive zero-cross event is detected.

5. The DC-DC converter of claim 4,
wherein said grounding current path switch is configured as a grounding current path switch; and
wherein the generated output signal has a rising edge which turns on said grounding current path switch.

6. A DC-DC converter configured to be coupled to a transformer and comprising:
a power switching device;
a mode control logic circuit configured to generate an ON-pulse;
a flip-flop configured to be set by said mode control logic circuit;
a current mode comparator configured to reset said flip-flop and to compare a signal based upon current flowing through said power switching device with a signal based upon an output voltage of the DC-DC converter;
said mode control logic circuit comprising
a timer configured to start when a gate driver control signal turns said power switching device off and to generate a pulse when an off time interval elapses,
a zero current detector circuit configured to sense a voltage on the transformer and generate a pulse when the voltage drops below a trigger threshold, and
a logic circuit configured to compare pulse signals generated by said timer and said zero current detector circuit and generate the ON-pulse based thereon; and
said mode control logic circuit further comprising
a set/reset flip flop configured to be set by the gate driver control signal to thereby produce a frequency limiter output signal,
a reference threshold comparator timer configured to generate an output signal which resets said set/reset flip flop and comprising a current path switch, and
a triggered capacitance charging ramp generator comprising a logic gate configured to OR the gate driver control signal and the output signal of said reference threshold comparator timer to thereby generate an output signal to turn on said current path switch.

7. The DC-DC converter of claim 6, wherein said timer comprises a ramp generating circuit configured to be triggered when said power switching device is turned off.

8. The DC-DC converter of claim 7, wherein said ramp generating circuit comprises a constant current generator configured to generate a current proportional to an input voltage of the converter.

9. The DC-DC converter of claim 6, wherein said frequency limiting circuit is configured to disable a pulse generated by said zero current detector circuit until a successive zero-cross event is detected.

10. The DC-DC converter of claim 9,
wherein said grounding current path switch is configured as a grounding current path switch; and
wherein the generated output signal has a rising edge which turns on said grounding current path switch.

11. A method of operating a DC-DC converter using a control logic circuit generating an ON-pulse that sets a rising edge triggered flip-flop which is reset by an output state of a current mode comparator comparing a signal representative of a current flowing through a power switching device with a signal representative of an output voltage of the DC-DC converter, for driving a primary winding of a transformer, comprising:
switching between a quasi-resonant discontinuous conduction mode and a fixed off time continuous conduction mode, based upon whichever of a zero current detect signal and an end off time signal occurs first;
the zero current detect signal indicating an end of a demagnetization of the transformer and turning on of the power switching device, in accordance with the quasi-resonant discontinuous conduction mode of operation;
the end off time signal being generated at expiration of an off time interval for turning on the power switching device, in accordance with the fixed off time conduction mode of operation; and
limiting an increase of a switching frequency of the DC-DC converter by preventing a first zero current detect signal, coincident with a lowered drain voltage valley in a drain voltage waveform, from causing the turning on of the power switching device and disabling the end off time signal for allowing power switching device turn-on at a successive zero-cross event as acknowledged by a successive zero current detect signal.

12. The method of claim 11, wherein switching from the quasi-resonant discontinuous conduction mode to the fixed off time continuous conduction mode occurs when in standby.

13. The method of claim 11, wherein switching from the quasi-resonant discontinuous conduction mode to the fixed off time continuous conduction mode occurs when operating at a low load and high input voltage.

14. A method of making a DC-DC converter configured to be switched between a quasi-resonant discontinuous conduction mode and a fixed off time continuous conduction mode and to be coupled to primary winding of a transformer:
configuring a mode control logic circuit to control a power switching device and to generate an ON-pulse;
configuring a rising edge triggered flip-flop to be set by the mode control logic circuit;
configuring a current mode comparator to reset the rising edge triggered flip-flop and to compare a signal representative of current flowing through the power switching device with a signal representative of an output voltage of the dual mode flyback DC-DC converter;
the mode control logic circuit comprising
a timer configured to start when a gate driver control signal applied to a driver stage turns the power switching device off and configured to generate a pulse when an off time interval elapses,
a zero current detector circuit configured to sense a voltage on the transformer and generate a pulse when the voltage drops below a trigger threshold, and
a combinatory logic circuit configured to OR pulse signals generated by the timer and the zero current detector circuit and generate the ON-pulse based thereon;
and limiting an increase of a switching frequency of the DC-DC converter by preventing a first zero current detect signal, coincident with a lowered drain voltage valley in a drain voltage waveform, from causing the turning on of the power switching device and disabling the end off time signal for allowing power switching device turn-on at a successive zero-cross event as acknowledged by a successive zero current detect signal.

15. The method of claim 14, wherein the mode control logic circuit further comprises a frequency limiting circuit configured to disable a pulse generated by the zero current detector circuit until a successive zero-cross event is detected.

16. The method of claim 15, wherein the frequency limiting circuit comprises:
- a set/reset flip flop set by the gate driver control signal to thereby produce a frequency limiter output signal;
- a reference threshold comparator timer generating an output signal which resets the set/reset flip flop and comprising a grounding current path switch; and
- a triggered capacitance charging ramp generator comprising a logic gate configure to OR the gate driver control signal and the output signal of the reference threshold comparator timer to thereby generate an output signal having a rising edge which turns on the grounding current path switch.

17. The method of claim 14, wherein the timer comprises a ramp generating circuit configured to be triggered when the power switching device is turned off.

18. The method of claim 14, wherein the constant current generator generates a current proportional to an input voltage of the DC-DC converter.

* * * * *